United States Patent
Ikeda

(10) Patent No.: US 7,344,140 B2
(45) Date of Patent: Mar. 18, 2008

(54) LIP-TYPE SEAL

(75) Inventor: Yasuhiro Ikeda, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 138 days.

(21) Appl. No.: 10/542,751

(22) PCT Filed: Jan. 30, 2004

(86) PCT No.: PCT/JP2004/000936

§ 371 (c)(1),
(2), (4) Date: Jul. 20, 2005

(87) PCT Pub. No.: WO2004/076894

PCT Pub. Date: Sep. 10, 2004

(65) Prior Publication Data

US 2006/0290069 A1     Dec. 28, 2006

(30) Foreign Application Priority Data

Feb. 27, 2003   (JP) ............................. 2003-052078

(51) Int. Cl.
*F16J 15/32* (2006.01)
(52) U.S. Cl. ............... 277/572; 277/576; 277/577; 277/551; 277/562
(58) Field of Classification Search ........... 277/551, 277/562, 564, 572, 576, 577
See application file for complete search history.

(56) References Cited

U.S. PATENT DOCUMENTS

| | | | | |
|---|---|---|---|---|
| 2,213,116 A | * | 8/1940 | Bernstein | 277/569 |
| 2,750,214 A | * | 6/1956 | Bermingham | 277/396 |
| 2,819,100 A | * | 1/1958 | Peterson | 277/421 |
| 2,950,135 A | * | 8/1960 | Adamson | 277/577 |
| 3,284,145 A | * | 11/1966 | Bixby | 384/484 |
| 3,362,719 A | * | 1/1968 | McCormick | 277/551 |
| 3,940,155 A | * | 2/1976 | Baumle | 277/558 |
| RE30,223 E | * | 3/1980 | Prescott et al. | 277/353 |
| 4,575,104 A | * | 3/1986 | Nagasawa et al. | 277/551 |

(Continued)

FOREIGN PATENT DOCUMENTS

JP     33-8815     6/1958

(Continued)

*Primary Examiner*—Alison K Pickard
(74) *Attorney, Agent, or Firm*—Wenderoth, Lind & Ponack, L.L.P.

(57) ABSTRACT

The lip-type seal of the present invention is a lip-type seal with which the outer periphery of a rotational shaft (S) supported by a predetermined housing (H) is sealed. The lip-type seal is made up of a first annular reinforcing member (11) and a first sealing member (12). The first reinforcing member (11) includes a wall surface part (11a) defining a hole through which the rotational shaft (S) is passed and a cylindrical part (11b) bent from the outer edge of the wall surface part (11a). The first sealing member (12) includes an annular base (12a) that is joined to the housing (H), a first lip part (12b) that extends almost conical from the base (12a) inwardly in the radial direction and that comes into contact with the rotational shaft (S), and an annular concave part (11c) formed on the base (12a) so as to detachably fit the cylindrical part (11b). Accordingly, a desired sealing capability can be secured, and the components can be easily assembled, disassembled, and recycled.

9 Claims, 13 Drawing Sheets

U.S. PATENT DOCUMENTS

| | | | |
|---|---|---|---|
| 4,623,153 A * | 11/1986 | Nagasawa | 277/551 |
| 5,083,802 A * | 1/1992 | Shimasaki et al. | 277/560 |
| 5,368,312 A | 11/1994 | Voit et al. | |
| RE34,874 E * | 3/1995 | Newman et al. | 277/625 |
| 6,264,205 B1 * | 7/2001 | Balsells | 277/551 |
| 6,367,811 B1 * | 4/2002 | Hosokawa et al. | 277/560 |
| 6,565,096 B2 * | 5/2003 | Ikeda et al. | 277/551 |
| 6,840,521 B2 * | 1/2005 | Ikeda | 277/551 |

FOREIGN PATENT DOCUMENTS

| | | |
|---|---|---|
| JP | 34-8017 | 5/1959 |
| JP | 8-247294 | 9/1996 |
| JP | 10-318377 | 12/1998 |
| JP | 2002-364759 | 12/2002 |
| WO | 02/42666 | 5/2002 |

\* cited by examiner

FIG. 1 - PRIOR ART

LIP-TYPE SEAL

TECHNICAL FIELD

The present invention relates generally to a lip-type seal with which the space between a housing and a rotational shaft, such as that of a compressor used in an air conditioning system of, for example, a vehicle, is sealed, and, more particularly to a lip-type seal that can be recycled.

BACKGROUND ART

In recent years, the technology for recycling a used lip-type seal has been developed as part of the environmental antipollution measures. As shown in FIG. 1, a conventional lip-type seal formed in consideration of recycling is known (see Japanese Published Unexamined Patent Publication No. 2002-364759, for example). This conventional lip-type seal is made up of a metallic core ring 1, a first rubber-made sealing member 2 that contains the core ring 1 and that is shaped almost conical, a second resinous sealing member 3 that adjoins the first sealing member 2 and that is shaped almost conical, and a metallic backup ring 4 that adjoins the second sealing member 3.

In this lip-type seal, the first sealing member 2 includes an annular base 2a joined to a housing H, for example, of a compressor, a lip part 2b that defines an inner edge in contact with a rotational shaft S rotatably supported by the housing H, an annular containing part 2c and an incision 2d to which the core ring 1 is fitted in the base 2a. The second sealing member 3 includes a substantially flat outer edge part 3a, and a lip part 3b that defines an inner edge in contact with the rotational shaft S. The backup ring 4 includes a cylindrical part 4a that is fitted to the inside of the base 2a and a wall surface part 4b that defines a circular hole through which the rotational shaft S is passed.

In order to assemble these components, the incision 2d of the first sealing member 2 is greatly widened, and the core ring 1 is inserted into the containing part 2c. Thereafter, the second sealing member 3 is inserted into the inside of the first sealing member 2, and the backup ring 4 is incorporated by fitting the cylindrical part 4a to the inside of the base 2a in such a way as to sandwich the second sealing member 3 between the first sealing member 2 and the backup ring 4.

However, in the assemblage into the lip-type seal, there is a need to greatly widen the incision 2d while the base 2a is being deformed and maintain that state when the core ring 1 is inserted into the containing part 2c, and hence workability is remarkably inferior in assembling. On the other hand, a difficulty lies in detaching the core ring 1 when the core ring 1 is attempted to be detached therefrom after the lip-type seal is used for a long time, because the core ring 1 is completely buried in the containing part 2c so that there is no part to be gripped, and the core ring 1 is in a state of having been firmly embedded as a result of longtime use.

Additionally, in the assembled state of the lip-type seal, the second sealing member 3 is sandwiched between the first sealing member 2 and the backup ring 4. However, since the first sealing member 2 is made of rubber, there is a fear that the second sealing member 3 cannot be reliably sandwiched therebetween because of its elastic deformation or time-dependent change.

The present invention has been made in consideration of these circumstances of the prior art, and it is an object of the present invention to provide a lip-type seal in which components can be easily assembled while securing the sealing function inherent therein, in which the components can be easily disassembled and sorted out, and in which the components can be recycled.

DISCLOSURE OF INVENTION

The lip-type seal of the present invention that achieves the object is a lip-type seal with which the outer periphery of a rotational shaft supported by a predetermined housing is sealed. The lip-type seal is made up of a first reinforcing member formed annularly and a first sealing member. The first reinforcing member includes a wall surface part defining a hole through which the rotational shaft is passed and a cylindrical part bent from the outer edge of the wall surface part. The first sealing member includes an annular base that is joined to the housing, a first lip part that extends almost conical from the base inwardly in the radial direction and that comes into contact with the rotational shaft, and an annular concave part formed on the base so as to detachably fit the cylindrical part of the first reinforcing member.

According to this constitution, the cylindrical part of the first reinforcing member is merely fitted into the annular concave part formed on the base of the first sealing member (without a caulking process or an adhesive), whereby the cylindrical part and the annular concave part are completely attached to each other. On the other hand, the cylindrical part and the annular concave part can be separated and sorted from each other merely by pulling out the cylindrical part from the annular concave part. Since the wall surface part of the first reinforcing member has the wall surface part that is integrally formed with the cylindrical part and that is in an exposed state although the cylindrical part is fitted into the concave part of the first sealing member and is in a buried state, the first reinforcing member can be easily pulled out from the first sealing member by gripping the wall surface part (while putting a finger into the hole or using a tool). Thus, the components can be easily attached and detached.

In the above constitution, the first reinforcing member may have an inner cylindrical part that supports the base in a sandwiched manner from the inside in cooperation with the cylindrical part, and the wall surface part of the first reinforcing member may extend from the inner cylindrical part.

According to this constitution, when the cylindrical part of the first reinforcing member is fitted into the concave part of the first sealing member, the inner cylindrical part of the first reinforcing member supports the base (i.e., part defined by the concave part and by the inner circumferential surface) in the radial direction in a sandwiched manner in cooperation with the cylindrical part located outside, and hence the cylindrical part and the concave part can be firmly attached to each other more reliably.

In the above constitution, the wall surface part of the first reinforcing member may be contiguous to the root area of the first lip part in the axial direction of the rotational shaft.

According to this constitution, since the wall surface part of the first reinforcing member serves to support the root area of the first lip part, the first lip part can be prevented from being deformed beyond a predetermined range. Additionally, since the wall surface part is merely disposed so as to be adjacent to the root area of the first lip part, these components can be easily detached from each other without trouble.

In the above constitution, the lip-type seal may further include a second sealing member sandwiched between the first reinforcing member and the first sealing member and a second reinforcing member formed annularly and fitted to the first sealing member on the side opposite the first reinforcing member. The second sealing member may include a to-be-sandwiched part sandwiched between the wall surface part of the first reinforcing member and the root area of the first lip part and a second lip part that extends almost conical from the to-be-sandwiched part inwardly in the radial direction and that can come into contact with the rotational shaft. The second reinforcing member may include an annular wall surface part that is brought into contact with the base in the axial direction of the rotational shaft and a cylindrical part that is bent from the inner edge of the annular wall surface and that is fitted to the inside of the base.

According to this constitution, the first reinforcing member, the first sealing member, the second sealing member, and the second reinforcing member can be completely assembled merely by fitting the cylindrical part of the first reinforcing member into the concave part of the first sealing member while supporting the to-be-sandwiched part of the second sealing member in a sandwiched manner and by fitting the cylindrical part of the second reinforcing member into the inside of the base. On the other hand, these components can be disassembled and sorted from each other merely by pulling out the cylindrical part of the first reinforcing member from the concave part and by pulling out the cylindrical part of the second reinforcing member from the inside of the base. Since the base of the first sealing member is sandwiched between the cylindrical part of the first reinforcing member and the cylindrical part of the second reinforcing member, the components can be assembled more reliably.

In the above constitution, the first sealing member may be made of rubber, and the second sealing member may be made of resin.

According to this constitution, since the first sealing member and the second sealing member can be easily separated as mentioned above, these components can be easily sorted from each other for recycling even if components differing in kind are used.

In the above constitution, the cylindrical part of the second reinforcing member may have a contact part that comes in contact with the root area of the first lip part in the axial direction of the rotational shaft.

According to this constitution, as a result of attaching the second reinforcing member, the contact part located at the end of the cylindrical part reliably supports the second sealing member (the to-be-sandwiched part) in a sandwiched manner in cooperation with the wall surface part of the first reinforcing member while restricting the deformation of the root area of the first lip part. Therefore, the second sealing member is attached more reliably.

In the above constitution, the wall surface part of the first reinforcing member may be provided with a rotation stopper that restricts the rotation of the second sealing member.

According to this constitution, the rotation stopper can prevent the second sealing member from being rotated although the second sealing member is merely sandwiched between the first reinforcing member and the first sealing member.

In the above constitution, the second reinforcing member may have a restriction part that is bent from the cylindrical part inwardly so as to be cylindrical and that restricts the deformation of the first lip part outwardly in the radial direction of the first lip part within a predetermined range.

According to this constitution, since the cylindrical restriction part is provided in such a way as to surround the first lip part outside in the radial direction of the first lip part, the first lip part can be prevented from being deformed outwardly beyond the allowable limits, and a desired sealing capability can be secured.

In the above constitution, an annular spring that exerts an urging force inwardly in the radial direction in the outer peripheral area of the first lip part may be detachably attached to the first sealing member.

According to this constitution, since the annular spring is provided in the outer peripheral area of the first lip part, the first lip part can be prevented from being deformed outwardly beyond the allowable limits, and a desired sealing capability can be secured. Additionally, since the spring is detachably attached, the components can be easily assembled and disassembled.

In the above constitution, a third reinforcing member that is formed annularly and that restricts the deformation caused inwardly in the radial direction of the first lip part within a predetermined range may be sandwiched between the first sealing member and the second sealing member.

According to this constitution, the third reinforcing member can prevent the first lip part from being deformed inwardly in the radial direction beyond the allowable limits, and a desired sealing capability can be secured. Additionally, since the third reinforcing member is merely sandwiched between the first sealing member and the second sealing member, the third reinforcing member can be easily attached and detached.

BEST MODE FOR CARRYING OUT THE INVENTION

The most preferred embodiments of the present invention will be hereinafter described with reference to the attached drawings. Herein, a description is given of a case in which a lip-type seal according to the present invention is used in a compressor C that serves as a part of an air conditioning system, for example, of a vehicle.

Figure 1:
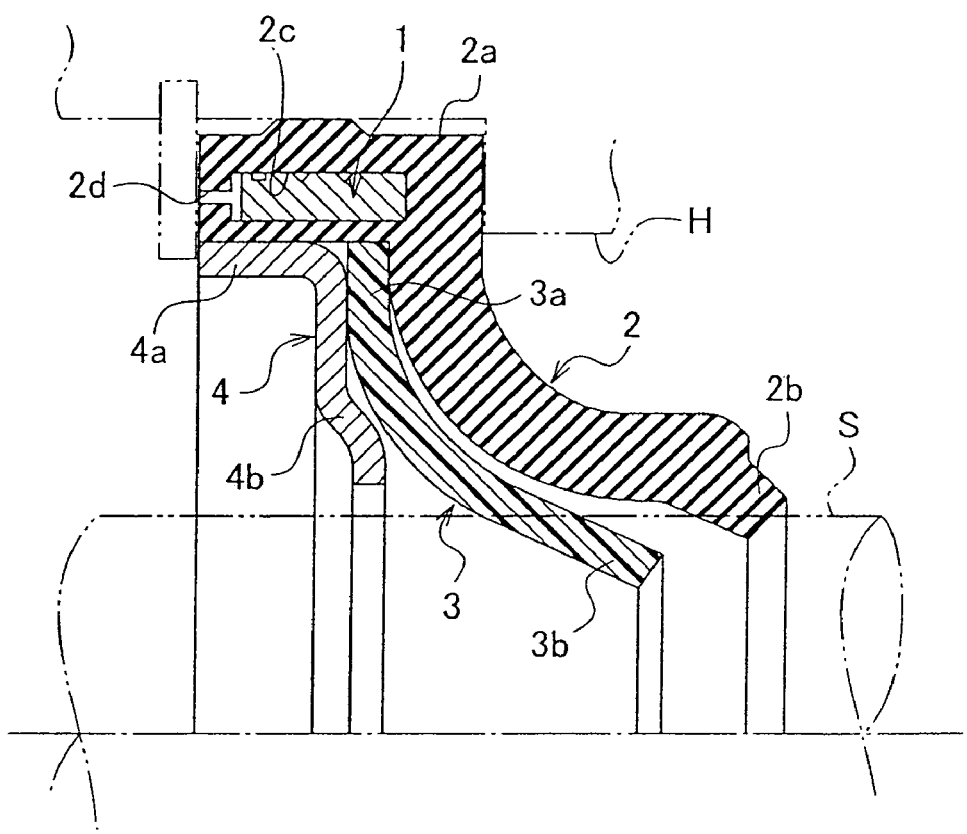
FIG. 1 is a partially sectional view showing a conventional lip-type seal.
Figure 2:
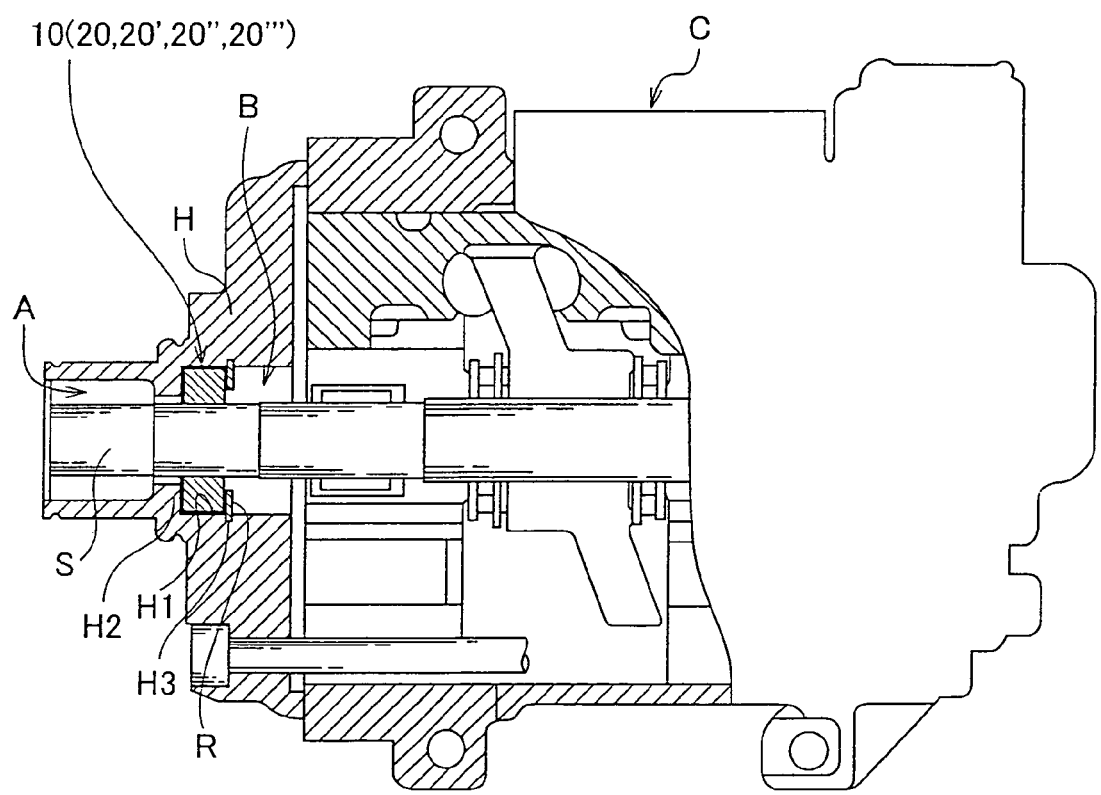
FIG. 2 is a partially sectional view showing a schematic structure of a compressor to which a lip-type seal according to the present invention is applied.

As shown in FIG. 2, a compressor C includes a housing H that defines the outline, a rotational shaft S that is contained in the housing H and that transmits a rotational driving force to a compression mechanism from the outside, and a lip-type seal 10 that blocks the air A and an internal space B from each other by sealing a space between the outer peripheral surface of the rotational shaft S and the housing H therewith.

Figure 3:
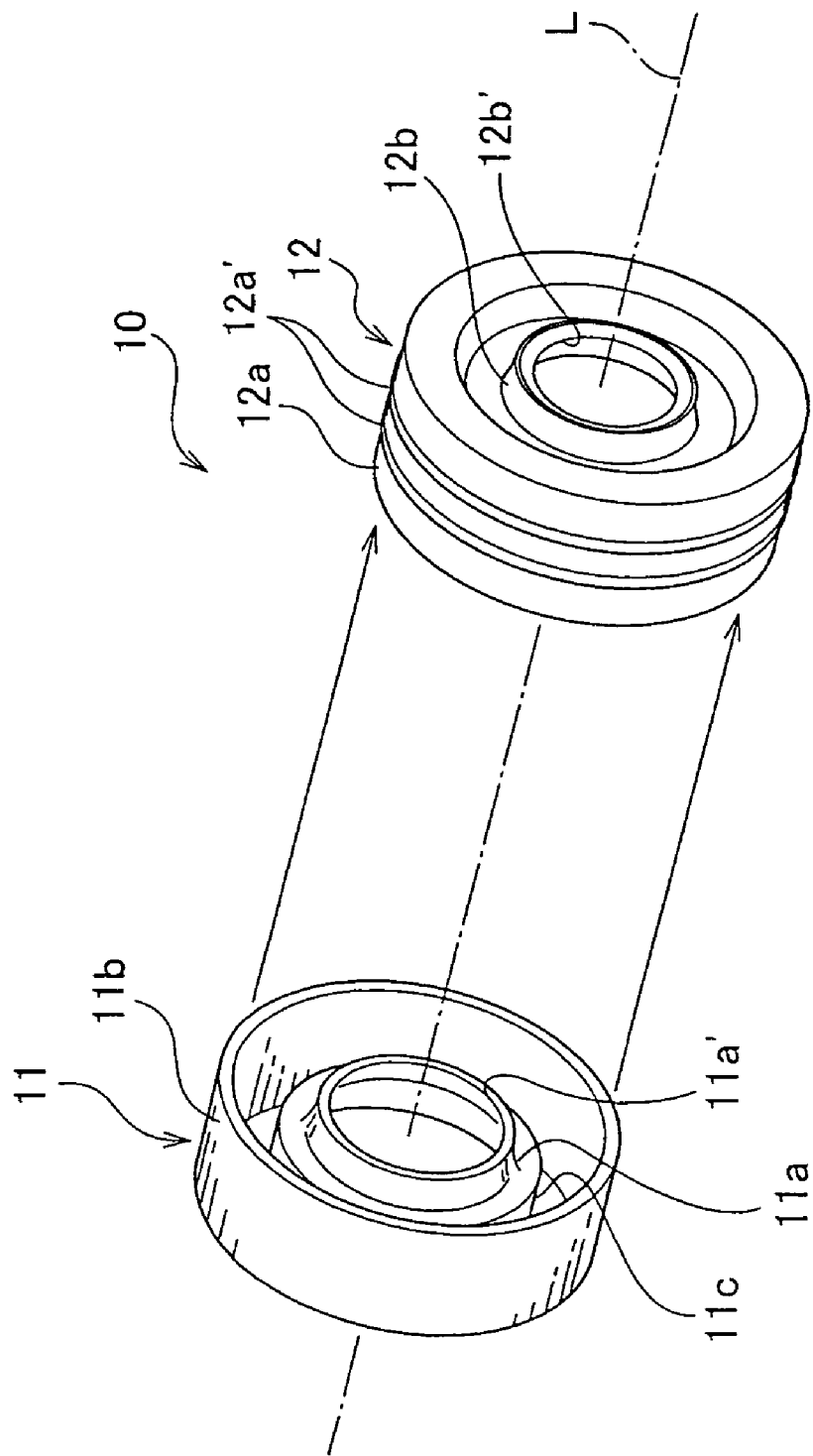
FIG. 3 is an exploded perspective view showing an embodiment of the lip-type seal according to the present invention.
Figure 4:
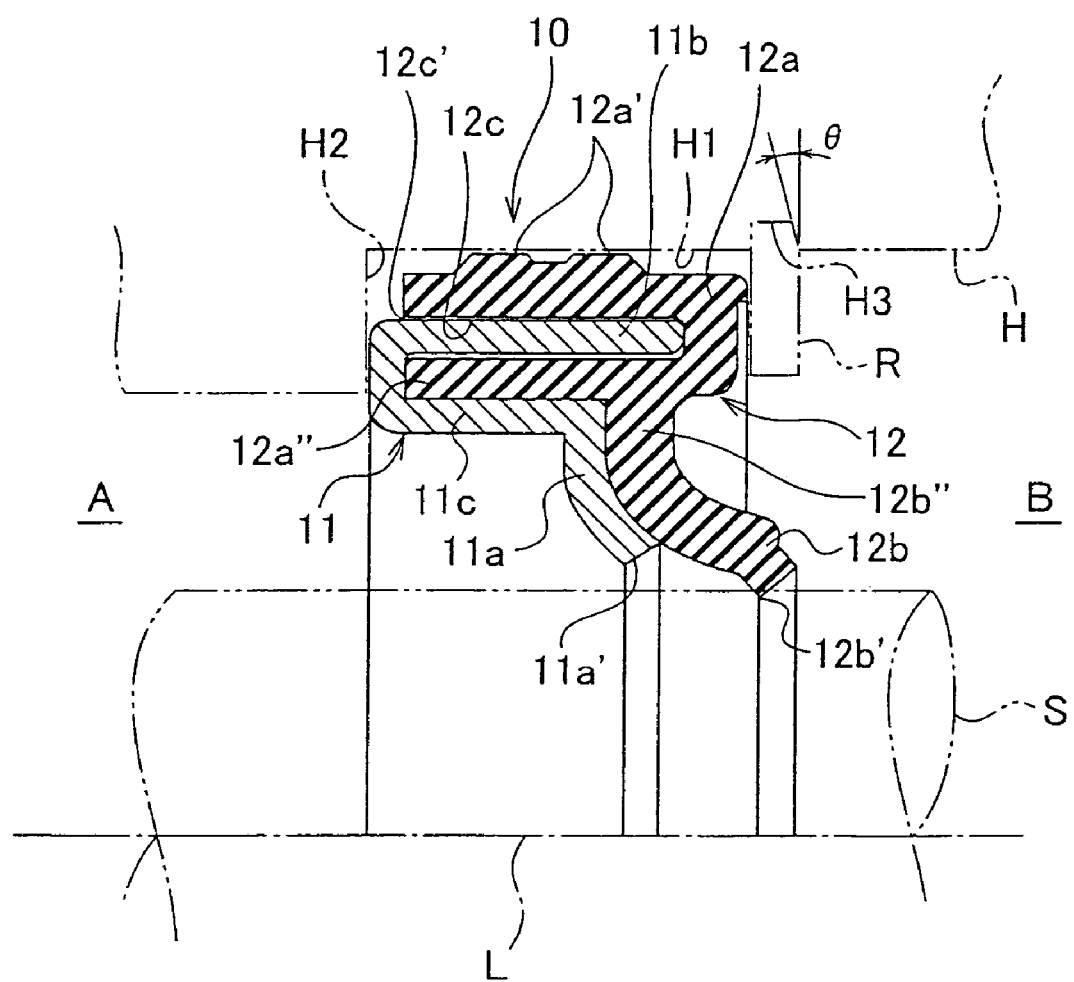
FIG. 4 is a partially sectional view of the lip-type seal of FIG. 3.

As shown in FIG. 3 and FIG. 4, the lip-type seal 10 is made up of a first reinforcing member 11 formed annularly and a first sealing member 12 formed annularly.

As shown in FIG. 3 and FIG. 4, the first reinforcing member 11, which is formed by subjecting a metallic plate, such as a cold-rolled steel strip or a stainless steel plate, to press working, has a wall surface part 11a that defines a circular hole 11a' through which the rotational shaft S is passed, a cylindrical part 11b that is bent from the outer edge of the wall surface part 11a and that extends in an axial direction L, and an inner cylindrical part 11c that is interposed between the wall surface part 11a and the cylindrical part 11b and that is formed coaxially with the cylindrical part 11b inside the cylindrical part 11b.

The first sealing member 12 is molded out of rubber such as H-NBR, and has an annular (cylindrical) base 12a that is joined to a wall surface H1 of the housing H and that extends in the axial direction L, a first lip part 12b that extends almost conical inwardly in the radial direction from the base 12a and that defines a circular inner edge 12b' coming into contact with the rotational shaft S, and an annular (cylindrical) concave part 12c that has an opening 12c' at its end face (on the side of the air A) in the base 12a and that is formed to receive the cylindrical part 11b, as shown in FIG. 3 and FIG. 4.

The first reinforcing member 11 is formed so that the wall surface part 11a can adjoin (can come into close contact with) a root area 12b" of a first lip part 12b in the axial direction L, whereby the first lip part 12b is prevented from being deformed inwardly in the radial direction beyond the allowable limits. Further, the first reinforcing member 11 is formed so that the inner cylindrical part 11c can be fitted into the inside of the base 12a, and a part 12a" of the base 12a (i.e., a part defined by the concave part 12c and the inner circumferential surface of the base 12a) can be supported radially in a sandwiched manner in cooperation with the cylindrical part 11b. As a result, the first reinforcing member 11 and the first sealing member 12 are reliably attached to each other.

The first sealing member 12 is provided with two projection parts 12a' that annularly protrude outwardly in the radial direction on the outer peripheral surface of the base 12a, whereby the adhesion with the wall surface H1 is improved.

Next, a description will be given of assembling and disassembling of the lip-type seal 10. First, in assembling, the first reinforcing member 11 and the first sealing member 12 are arranged in the axial direction L as shown in FIG. 3, and the cylindrical part 11b of the first reinforcing member 11 is fitted into the annular concave part 12c formed on the base 12a of the first sealing member 12. Attaching is completed with ease merely by fitting the cylindrical part 11b into the annular concave part 12c without a caulking process or an adhesive. In this state, the base 12a is reliably sandwiched between the cylindrical part 11b and the inner cylindrical part 11c, so that these components are reliably attached to each other.

On the other hand, in disassembling, the first reinforcing member 11 and the first sealing member 12 can be reliably separated merely by pulling out the cylindrical part 11b from the annular concave part 12c. Herein, since the first reinforcing member 11 has the wall surface part 11a exposed and integrally formed with the cylindrical part 11b that is fitted and buried in the concave part 12c of the first sealing member 12, the components can be easily disassembled by gripping the wall surface part 11a, for example, while putting a finger into the circular hole 11a' or while using a tool.

Further, when the lip-type seal 10 is attached to the compressor C, the rotational shaft S is passed so that the inner edge 12b' of the first lip part 12b comes into contact with the outer peripheral surface of the rotational shaft S as shown in FIG. 4, the base 12a of the first sealing member 12 is then fitted to the wall surface H1, and a snap ring R is attached so as to come into contact with the first sealing member 12 in a state in which the end face of the first reinforcing member 11 is in contact with a wall surface H2.

The snap ring R has an inclined surface with an inclination angle θ of about 10 to 20 degrees, preferably 15 degrees, and presses the lip-type seal 10 against the wall surface H2 by being fitted into an annular groove H3 formed to likewise have an inclined surface in the housing H.

In this embodiment, the inner cylindrical part 11c is provided in the first reinforcing member 11. However, without being limited to this, the present invention may have a structure in which the cylindrical part 11b is directly provided to be bent from the outer edge of the wall surface part 11a, without providing the inner cylindrical part 11c.

Figure 5:
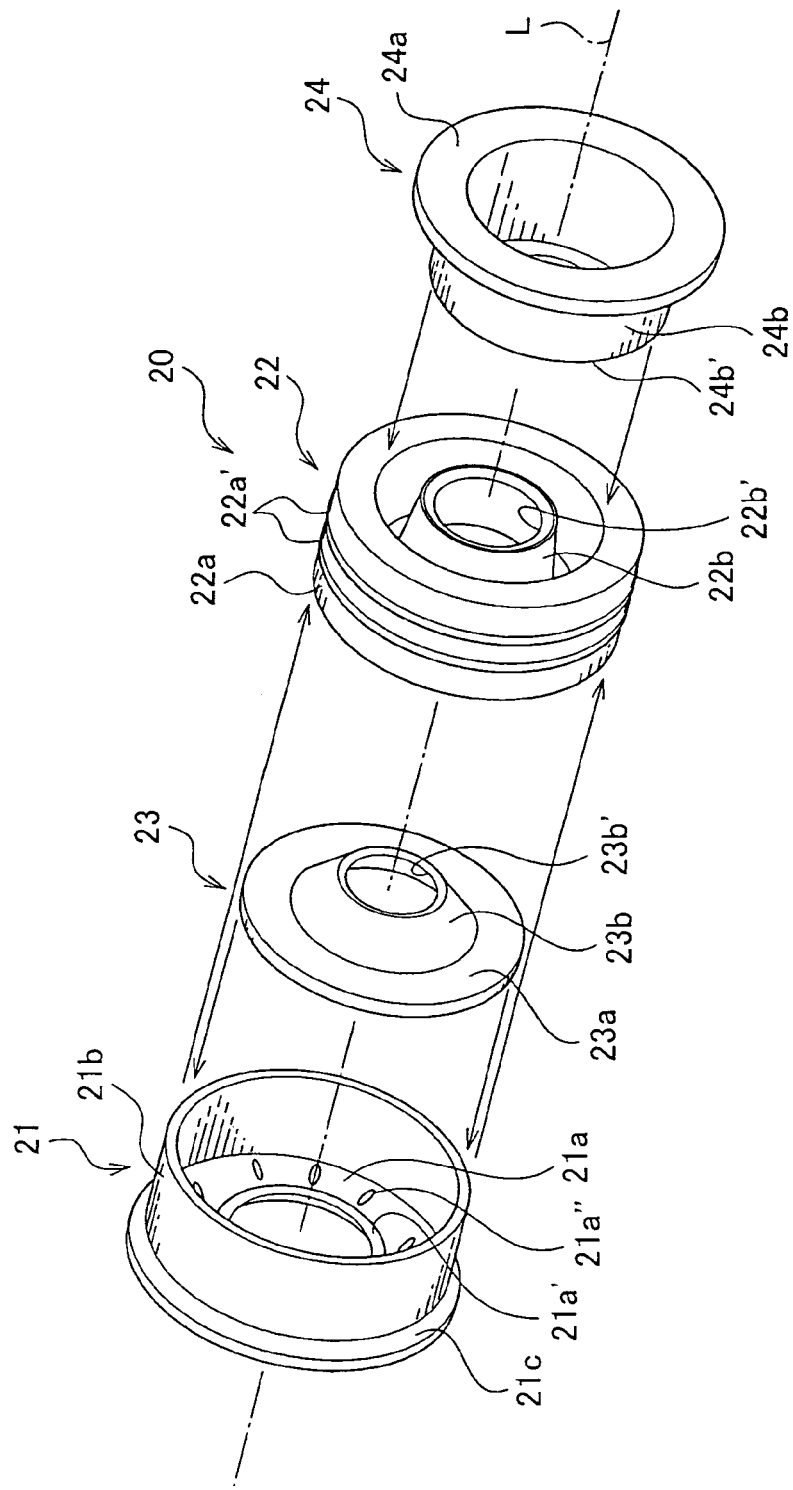
FIG. 5 is an exploded perspective view showing another embodiment of the lip-type seal according to the present invention.
Figure 6:
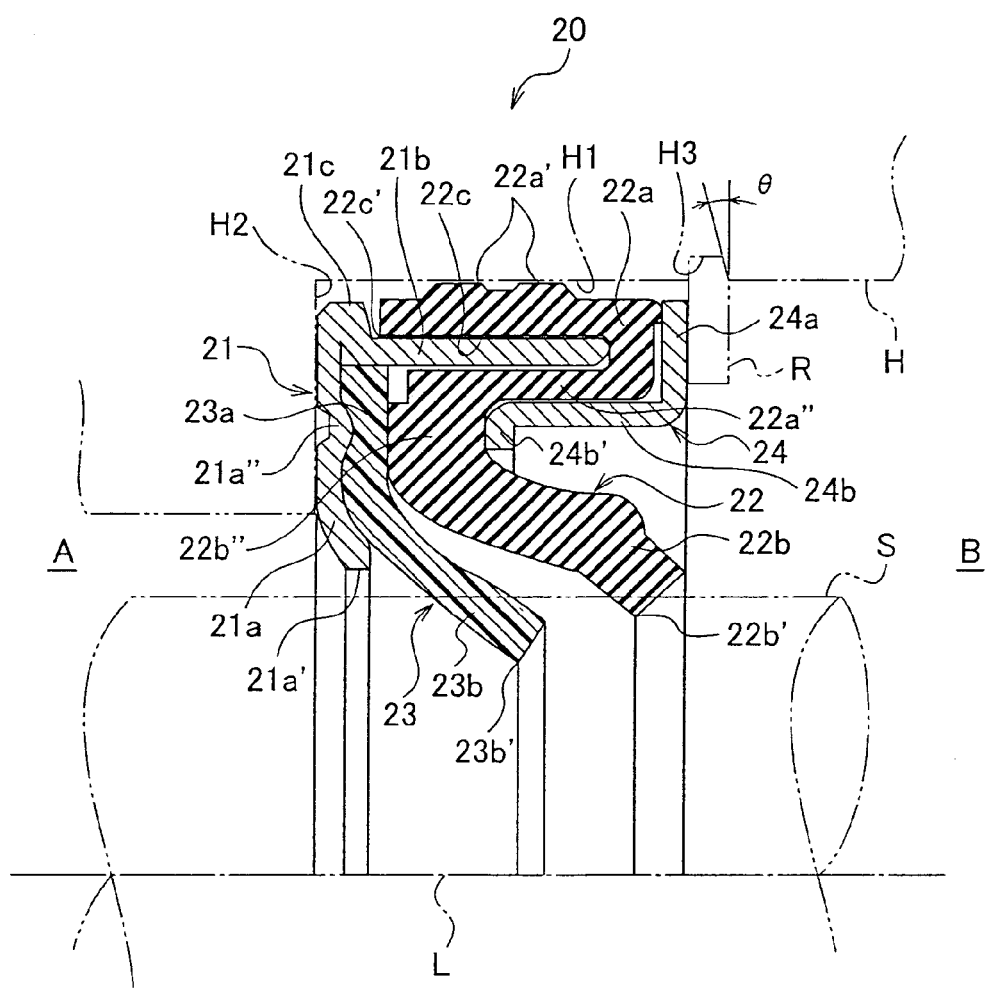
FIG. 6 is a partially sectional view of the lip-type seal of FIG. 5.

FIG. 5 and FIG. 6 show another embodiment of the lip-type seal according to the present invention, in which a second sealing member and a second reinforcing member are added to the components used in the foregoing embodiment. The same reference symbol is given to the same constituent element as in the foregoing embodiment, and overlapping description thereof is omitted.

As shown in FIG. 5 and FIG. 6, the lip-type seal 20 is made up of a first reinforcing member 21 formed annularly, a first sealing member 22 formed annularly, a second sealing member 23 sandwiched between the first reinforcing member 21 and the first sealing member 22, and a second reinforcing member 24 fitted to the first sealing member 22 on the side opposite the first reinforcing member 21.

The first reinforcing member 21 is formed by subjecting a metallic plate, such as a cold-rolled steel strip or a stainless steel plate, to press working, and, as shown in FIG. 5 and FIG. 6, has a wall surface part 21a that defines a circular hole 21a' through which a rotational shaft S is passed, a cylindrical part 21b that is bent from the outer edge of the wall surface part 21a and that extends in the axial direction L, and a collar part 21c formed by widening its radius in the bent region between the wall surface part 21a and the cylindrical part 21b.

The wall surface part 21a is provided with a plurality of projections 21a" that serve as rotation stoppers arranged in the circumferential direction on the surface to which the second sealing member 23 is joined. The projections 21a" can effectively restrict the rotation of the second sealing member 23 although the second sealing member 23 is merely supported in a sandwiched manner.

The first sealing member 22 is molded out of rubber such as H-NBR, and, as shown in FIG. 5 and FIG. 6, has an annular (cylindrical) base 22a that is joined to a wall surface H1 of the housing H and that extends in the axial direction L, a first lip part 22b that extends almost conical inwardly in the radial direction from the base 22a and that defines a circular inner edge 22b' coming into contact with the rotational shaft S, and an annular (cylindrical) concave part 22c that has an opening 22c' at its end face (on the side of the air A) in the base 22a and that is formed to receive the cylindrical part 21b.

Two projection parts 22a' that annularly protrude outwardly in the radial direction are formed on the outer peripheral surface of the base 22a, whereby the adhesion with the wall surface H1 is improved as in the foregoing embodiment.

The second sealing member 23 is molded out of resin such as tetrafluoroethylene resin, and, as shown in FIG. 5 and FIG. 6, has a to-be-sandwiched part 23a flatly formed with a circular outline so as to be sandwiched between the wall surface part 21a and the root area 22b" of the first lip part 22b and a second lip part 23b that extends almost conical inwardly in the radial direction from the to-be-sandwiched part 23a and that defines a circular inner edge 23b' coming into contact with the rotational shaft S.

Like the first reinforcing member 21, the second reinforcing member 24 is formed by subjecting a metallic plate, such as a cold-rolled steel strip or a stainless steel plate, to press working, and, as shown in FIG. 5 and FIG. 6, has a flat annular wall surface part 24a that is brought into contact with the end face (on the side of the internal space B) of the base 22a in the axial direction L, a cylindrical part 24b that is bent from the outer edge of the annular wall surface part 24a and that extends in the axial direction L, and a contact part 24b' that is vertically bent at the end of the cylindrical part 24b and that comes into contact with the root area 22b" of the first lip part 22b.

Next, a description will be given of assembling and disassembling of the lip-type seal 20. First, in assembling, the first reinforcing member 21, the second sealing member 23, the first sealing member 22, and the second reinforcing member 24 are arranged in the axial direction L as shown in FIG. 5, the cylindrical part 21b of the first reinforcing member 21 is then fitted into the concave part 22a of the first sealing member 22 in such a way as to sandwich the to-be-sandwiched part 23a of the second sealing member 23 therebetween, and the cylindrical part 24b of the second reinforcing member 24 is fitted into the inside of the base 22a. The first reinforcing member 21, the first sealing member 22, the second sealing member 23, and the second reinforcing member 24 are completely assembled merely by fitting these components thereinto without a caulking process or an adhesive.

In this state, the contact part 24b' of the second reinforcing member 24 reliably supports the second sealing member 23 (the to-be-sandwiched part 23a) in a sandwiched manner in cooperation with the wall surface part 21a of the first reinforcing member 21 while restricting the deformation of the root area 22b" of the first lip part 22b. Further, the projections 21a" of the wall surface part 21a restricts the rotation of the second sealing member 23 (to-be-sandwiched part 23a), whereby the second sealing member 23 is reliably assembled to a predetermined position.

A part 22a" of the base 22a (i.e., a part defined by the concave part 22c and the inner circumferential surface of the base 22a) is reliably sandwiched in the radial direction between the cylindrical part 21b of the first reinforcing member 21 and the cylindrical part 24b of the second reinforcing member 24, so that the first reinforcing member 21, the first sealing member 22, and the second reinforcing member 24 are reliably assembled to each other.

On the other hand, in disassembling, the components can be reliably separated from each other merely by pulling out the cylindrical part 21b of the first reinforcing member 21 from the concave part 22c and by pulling out the cylindrical part 24b of the second reinforcing member 24 from the inside of the base 22a. As in the foregoing embodiment, since the first reinforcing member 21 has the wall surface part 21a exposed and integrally formed with the cylindrical part 21b that is fitted and buried in the concave part 22c, the components can be easily disassembled by gripping the wall surface part 21a, for example, while putting a finger into the circular hole 21a' or using a tool.

When the lip-type seal 20 is attached to the compressor C, a snap ring R is attached as shown in FIG. 6 in the same way as in the foregoing embodiment.

Figure 7:
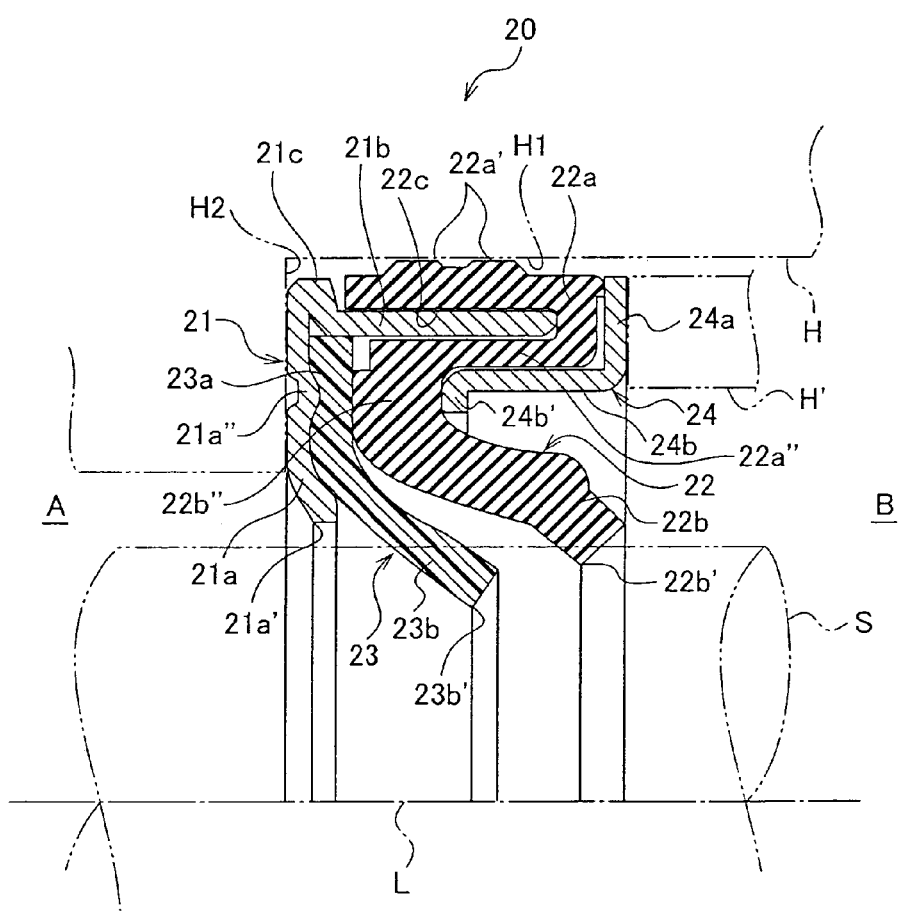
FIG. 7 is a partially sectional view showing another method for attaching the lip-type seal of FIG. 5.

Another method may be carried out as follows. Instead of the snap ring R, another member H' disposed in the housing H (or, alternatively, a part of the housing H) is brought into contact with the annular wall surface part 24a of the second reinforcing member 24 from the axial direction L, and the lip-type seal 20 is pressed against the wall surface H2 as shown in FIG. 7.

In this embodiment, the projection 21a" is provided on the wall surface part 21a as a rotation stopper that restricts the rotation of the second sealing member 23. Instead, a similar projection may be molded integrally with the root area 22b" of the first sealing member 22.

In this embodiment, the contact part 24b' is provided in the second reinforcing member 24. However, the cylindrical part 24b may be shortened, and the contact part 24b' may be removed as long as the second sealing member 23 is reliably sandwiched. Alternatively, the cylindrical part 24b may be fitted to the inside of the base 22a in a slightly loosened state.

Figure 8:
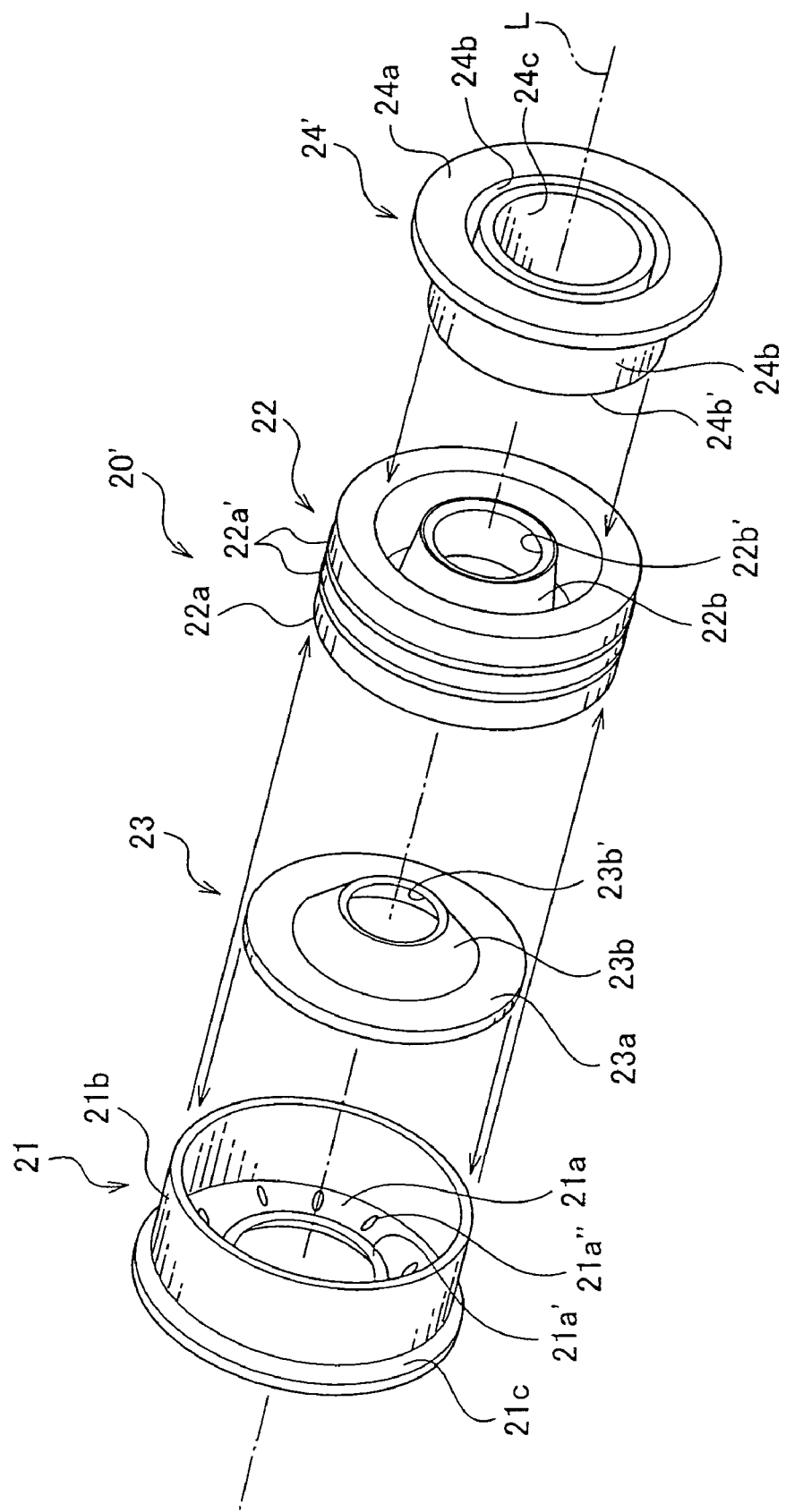
FIG. 8 is an exploded perspective view showing still another embodiment of the lip-type seal according to the present invention.
Figure 9:
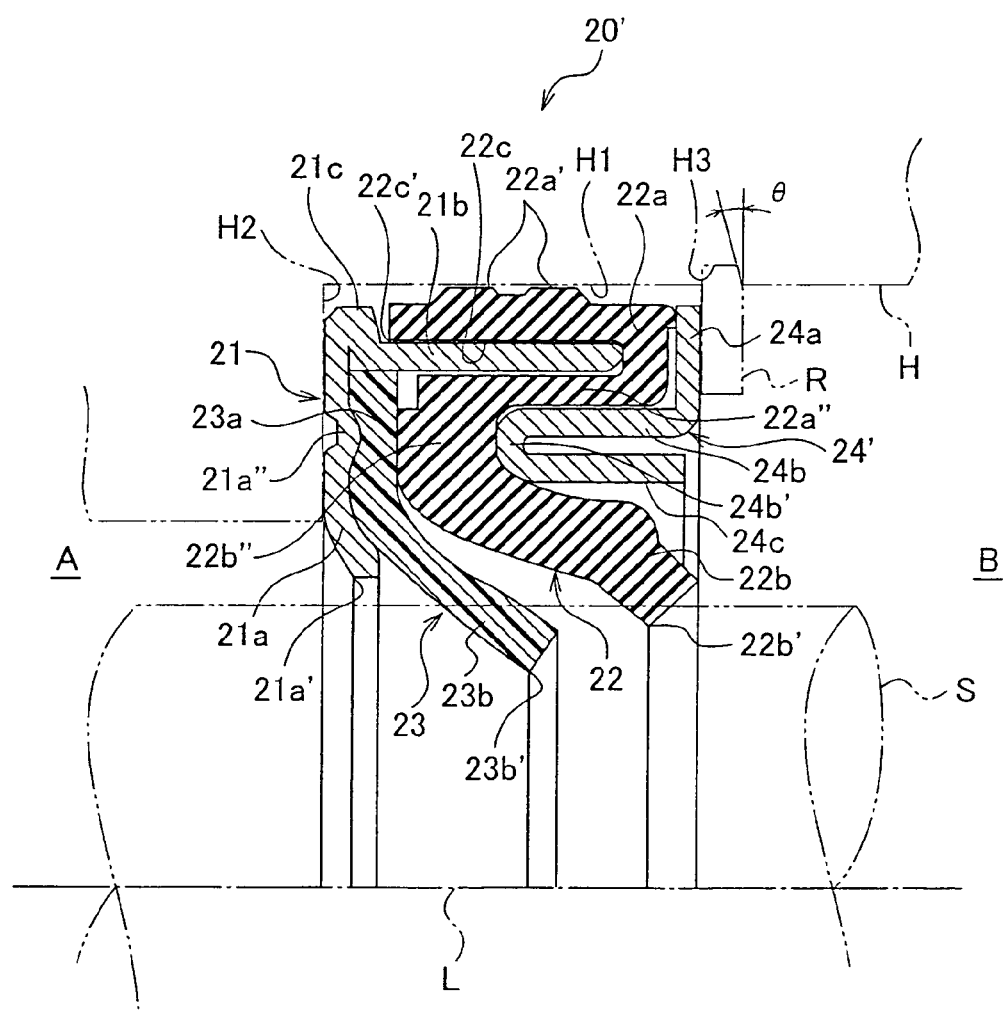
FIG. 9 is a partially sectional view of the lip-type seal of FIG. 8.

FIG. 8 and FIG. 9 show still another embodiment of the lip-type seal according to the present invention, in which the second reinforcing member shown in the above embodiment of FIG. 5 and FIG. 6 is changed. Therefore, the same reference symbol is given to the same structure as in the foregoing embodiment, and overlapping description thereof is omitted.

In this lip-type seal 20', the second reinforcing member 24' has a restriction part 24c formed cylindrically so as to be bent further inwardly from the contact part 24b' and to extend in the axial direction L, in addition to the annular wall surface part 24a, the cylindrical part 24b, and the contact part 24b', as shown in FIG. 8 and FIG. 9.

As shown in FIG. 9, the restriction part 24c is formed cylindrically so as to surround the first lip part 22b outside in the radial direction of the first lip part 22b in the assembled state, whereby the first lip part 22b is prevented from being deformed outwardly beyond the allowable limits. Therefore, a desired sealing capability can be secured without influence of fluids in the internal space B.

As in the foregoing embodiment, in this lip-type seal 20', the components can be easily assembled and disassembled while securing such a desired sealing capability.

Figure 10:
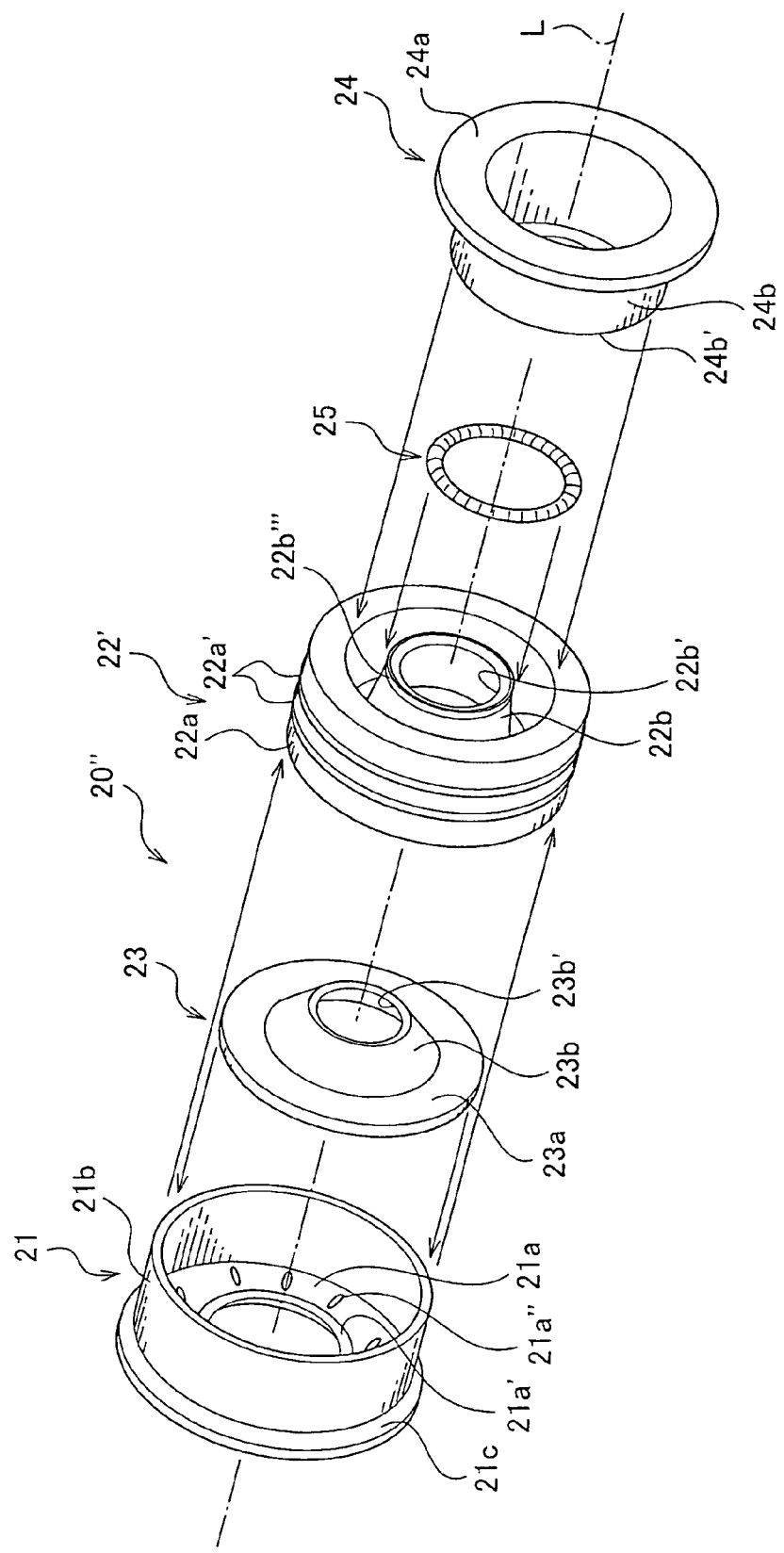
FIG. 10 is an exploded perspective view showing still another embodiment of the lip-type seal according to the present invention.
Figure 11:
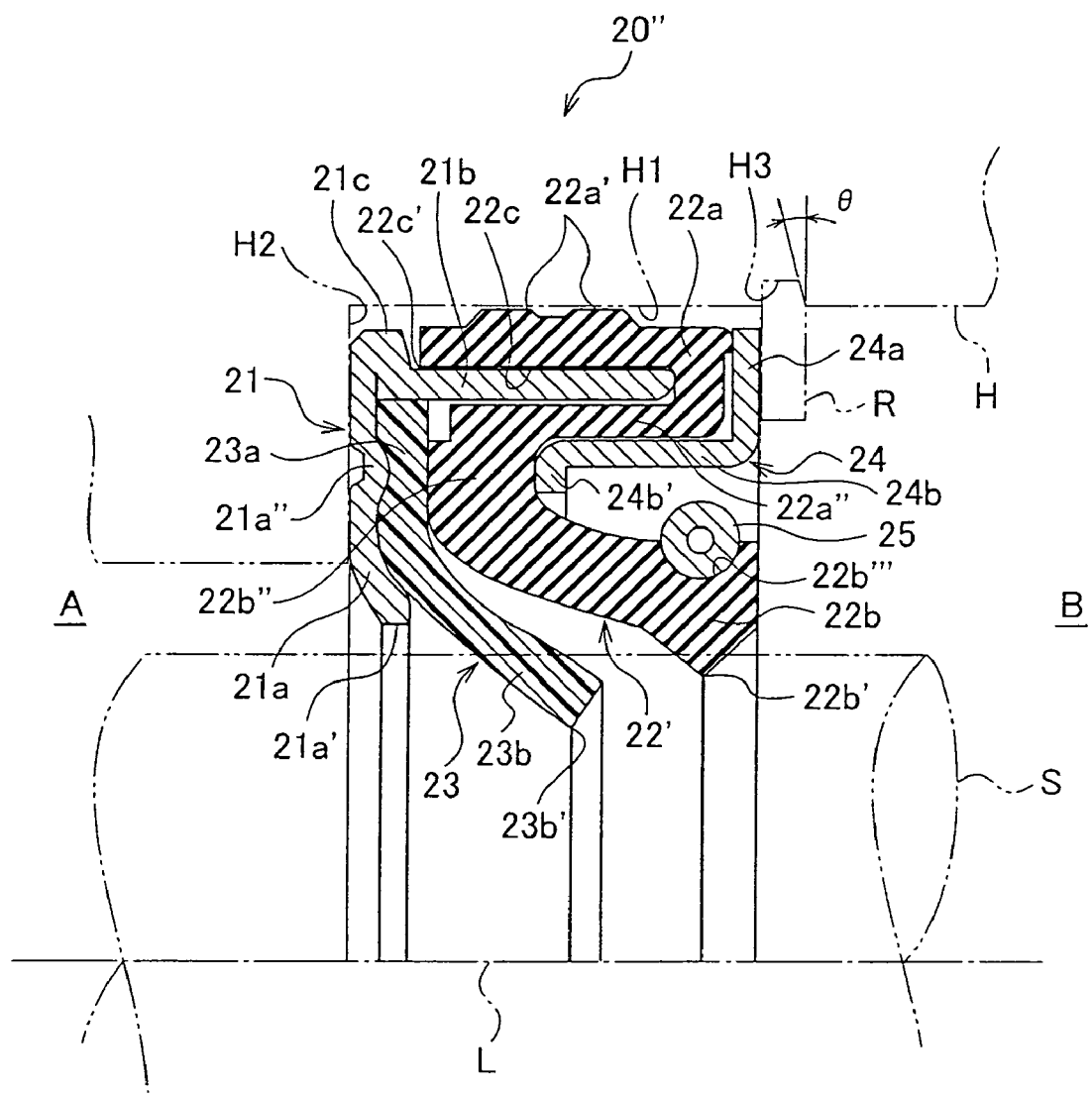
FIG. 11 is a partially sectional view of the lip-type seal of FIG. 10.

FIG. 10 and FIG. 11 show still another embodiment of the lip-type seal according to the present invention, in which the first sealing member shown in the embodiment of FIG. 5 and FIG. 6 is partially changed and in which an annular spring 25 is added. Therefore, the same reference symbol is given to the same structure as in the foregoing embodiment, and overlapping description thereof is omitted.

As shown in FIG. 10 and FIG. 11, in this lip-type seal 20", the first sealing member 22' has an annular groove 22b''' formed in the outer peripheral surface of the first lip part 22b, in addition to the annular base 22a, the first lip part 22b, the annular concave part 22c, and the opening 22c'.

As shown in FIG. 10 and FIG. 11, the annular spring 25 is detachably attached to the groove 22b'''. The spring 25 always exerts a predetermined urging force onto the first lip part 22b inwardly in the radial direction, and prevents the first lip part 22b from being deformed outwardly beyond the allowable limits. Therefore, a desired sealing capability can be secured without influence, for example, of fluids in the internal space B. As in the foregoing embodiment, in this lip-type seal 20", the components can be easily assembled and disassembled while securing such a desired sealing capability.

Figure 12:
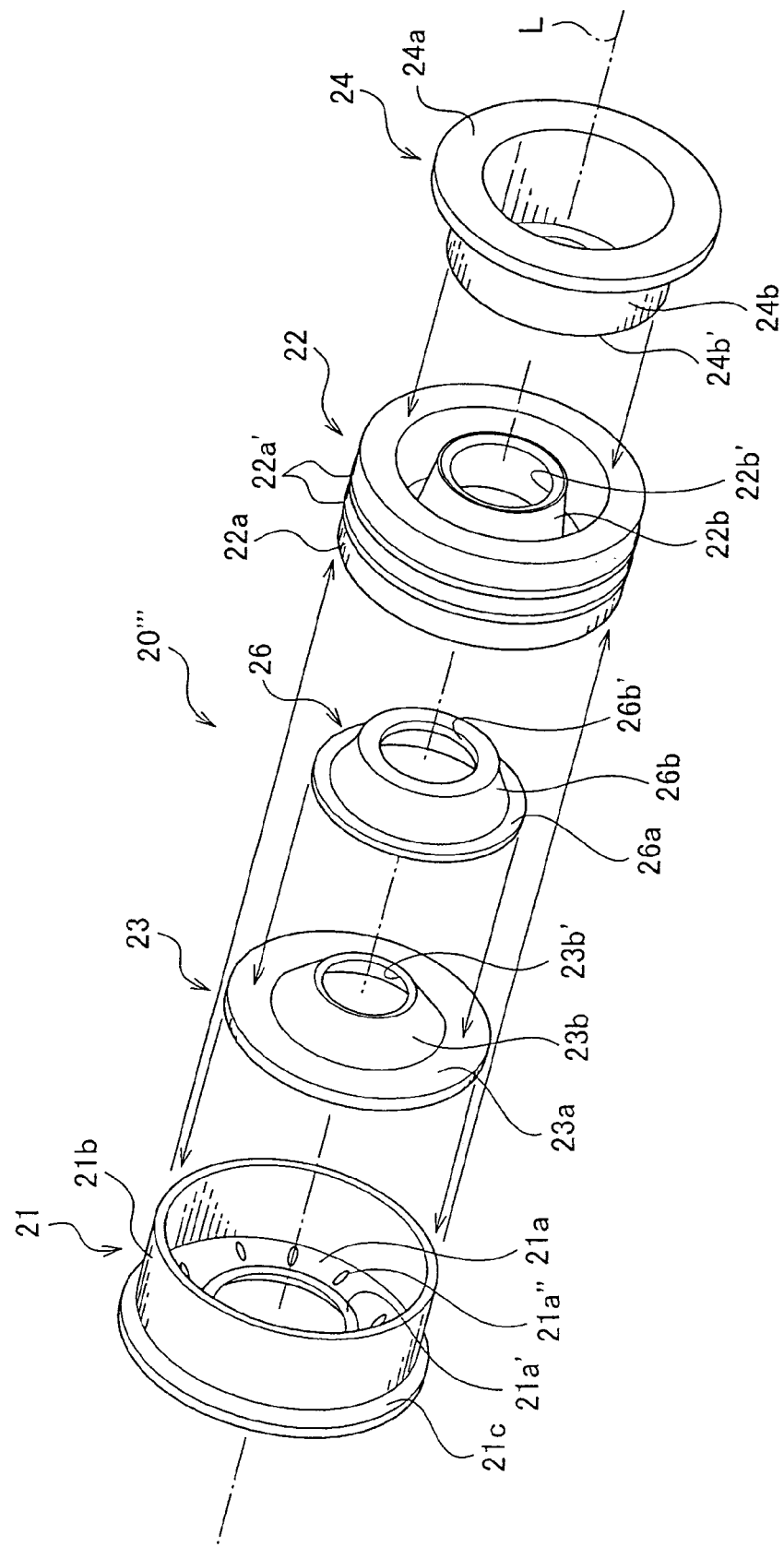
FIG. 12 is an exploded perspective view showing still another embodiment of the lip-type seal according to the present invention.
Figure 13:
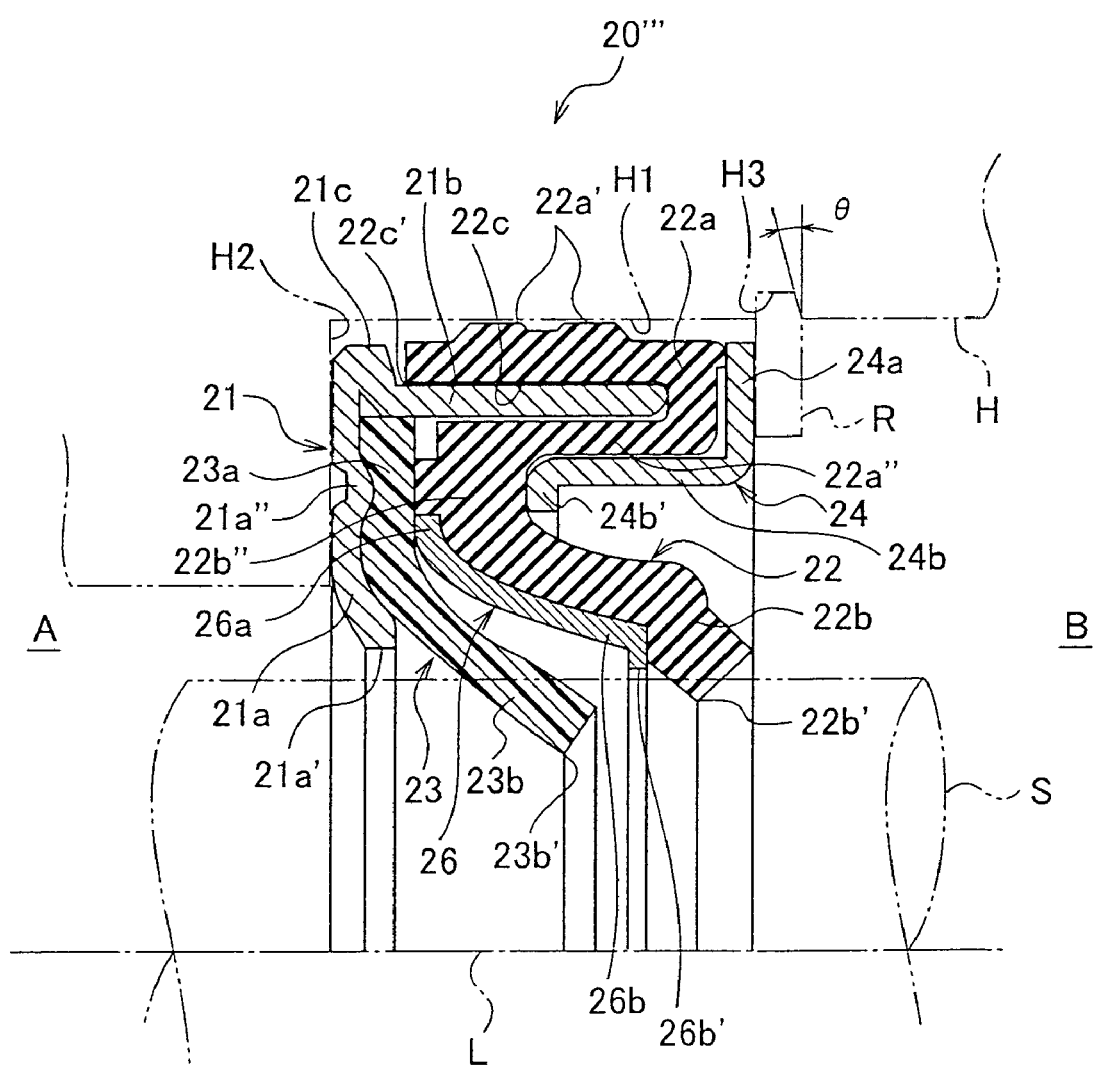
FIG. 13 is a partially sectional view of the lip-type seal of FIG. 12.

FIG. 12 and FIG. 13 show still another embodiment of the lip-type seal according to the present invention, in which a third reinforcing member 26 is added to the components shown in the embodiment of FIG. 5 and FIG. 6. Therefore, the same reference symbol is given to the same structure as in the foregoing embodiment, and overlapping description thereof is omitted.

As shown in FIG. 12 and FIG. 13, in this lip-type seal 20''', the third annular reinforcing member 26 is sandwiched between the first sealing member 22 and the second sealing member 23.

The third reinforcing member 26 is formed by subjecting a metallic plate, such as a cold-rolled steel strip or a stainless steel plate, to press working, and, as shown in FIG. 12 and FIG. 13, has a substantially flat to-be-sandwiched part 26a having a circular outline so as to be sandwiched between the to-be-sandwiched part 23a of the second sealing member 23 and the root area 22b" of the first sealing member 22 and a slant surface part 26b that extends almost conical inwardly in the radial direction from the to-be-sandwiched part 26a and that defines a circular hole 26b' through which the rotational shaft S is passed.

As shown in FIG. 13, the slant surface part 26b is formed to adjoin (come into close contact with) the first lip part 22b of the first sealing member 22, whereby the first lip part 22b is prevented from being deformed inwardly beyond the allowable limits. Therefore, a desired sealing capability can be secured without influence, for example, of fluids in the internal space B. As in the foregoing embodiment, in this lip-type seal 20''', the components can be easily assembled and disassembled while securing such a desired sealing capability.

In the embodiments described above, the lip-type seals 10, 20, 20', 20", and 20''' are applied to the compressor C that serves as apart of an air conditioning system, for example, of a vehicle. However, without being limited to this, the lip-type seal can be applied to any apparatus or electrical appliance if these devices include a rotational shaft and a housing which supports the rotational shaft.

INDUSTRIAL APPLICABILITY

As described above, the lip-type seal of the present invention is easily attached, detached, and sorted while maintaining its desired sealing capability, and hence a recycling process can be easily carried out. Therefore, the lip-type seal is useful in an apparatus or electrical appliance that is required to seal the outer periphery of its rotational shaft with such a lip-type seal.

What is claimed is:

1. A lip-type seal with which an outer periphery of a rotational shaft supported by a predetermined housing is to be sealed, the lip-type seal comprising:
    a first reinforcing member formed annularly, the first reinforcing member including a wall surface part defining a hole through which the rotational shaft is to be passed and a cylindrical part bent from an outer edge of the wall surface part; and
    a first sealing member, the first sealing member including an annular base to be joined to the housing, a first lip part that extends almost conically inwardly in a radial direction from the base so as to come into contact with the rotational shaft, and an annular concave part formed on the base so as to detachably fit the cylindrical part;
    wherein the first reinforcing member has an inner cylindrical part that supports the base in a sandwiched manner from the inside in cooperation with the cylindrical part, and the wall surface part extends from the inner cylindrical part.

2. The lip-type seal as set forth in claim 1, wherein the wall surface part is contiguous to a root area of the first lip part in an axial direction of the rotational shaft.

3. A lip-type seal with which an outer periphery of a rotational shaft supported by a predetermined housing is to be sealed, the lip-type seal comprising:
    a first reinforcing member formed annularly, the first reinforcing member including a wall surface part defining a hole through which the rotational shaft is to be passed and a cylindrical part bent from an outer edge of the wall surface part;
    a first sealing member, the first sealing member including an annular base to be joined to the housing, a first lip part that extends almost conically inwardly in a radial direction from the base so as to come into contact with the rotational shaft, and an annular concave part formed on the base so as to detachably fit the cylindrical part;
    a second sealing member that is sandwiched between the first reinforcing member and the first sealing member; and
    a second reinforcing member that is formed annularly and that is fitted to the first sealing member on a side opposite the first reinforcing member;
    wherein the second sealing member includes
        a to-be-sandwiched part that is sandwiched between the wall surface part and the root area of the first lip part; and
        a second lip part that extends almost conically from the to-be-sandwiched part inwardly in a radial direction so as to come into contact with the rotational shaft; and
    wherein the second reinforcing member includes
        an annular wall surface part that is brought into contact with the base in the axial direction of the rotational shaft, and
        a cylindrical part that is bent from the inner edge of the annular wall surface and that is fitted to the inside of the base.

4. The lip-type seal as set forth in claim 3, wherein the first sealing member is made of rubber, and
    the second sealing member is made of resin.

5. The lip-type seal as set forth in claim 3, wherein the cylindrical part of the second reinforcing member has a contact part that comes into contact with the root area of the first lip part in the axial direction of the rotational shaft.

6. The lip-type seal as set forth in claim 3, wherein the wall surface part of the first reinforcing member is provided with a rotation stopper that restricts the rotation of the second sealing member.

7. The lip-type seal as set forth in claim 3, wherein the second reinforcing member has a restriction part that is bent from the cylindrical part inwardly so as to be cylindrical and that restricts deformation of the first lip part caused outwardly in the radial direction of the first lip part within a predetermined range.

8. The lip-type seal as set forth in claim 3, wherein the first sealing member is detachably provided with an annular spring that exerts an urging force inwardly in the radial direction in an outer peripheral area of the first lip part.

9. The lip-type seal as set forth in claim 3, wherein a third reinforcing member that is formed annularly and that restricts deformation of the first lip part caused inwardly in the radial direction of the first lip part within a predetermined range is sandwiched between the first sealing member and the second sealing member.

* * * * *